United States Patent
Greulich et al.

(10) Patent No.: US 12,497,671 B2
(45) Date of Patent: Dec. 16, 2025

(54) METHODS AND COMPOSITIONS FOR PRE-EXTRACTIVE BENEFICIATION OF ORES

(71) Applicant: Ecolab USA Inc., St. Paul, MN (US)

(72) Inventors: Christopher Ryan Greulich, Tucson, AZ (US); Michael Ignazio LaRosa, Palacios, TX (US); Ronald Verne Davis, Geneva, IL (US)

(73) Assignee: Ecolab USA Inc., St. Paul, MN (US)

( * ) Notice: Subject to any disclaimer, the term of this patent is extended or adjusted under 35 U.S.C. 154(b) by 1303 days.

(21) Appl. No.: 17/268,356

(22) PCT Filed: Sep. 24, 2019

(86) PCT No.: PCT/US2019/052554
§ 371 (c)(1),
(2) Date: Feb. 12, 2021

(87) PCT Pub. No.: WO2020/068721
PCT Pub. Date: Apr. 2, 2020

(65) Prior Publication Data
US 2021/0214819 A1     Jul. 15, 2021

Related U.S. Application Data

(60) Provisional application No. 62/735,543, filed on Sep. 24, 2018.

(51) Int. Cl.
*C01F 7/06*        (2022.01)
*A61F 9/08*        (2006.01)
(Continued)

(52) U.S. Cl.
CPC ................. *C22B 1/00* (2013.01); *A61F 9/08* (2013.01); *C22B 11/00* (2013.01); *C22B 15/00* (2013.01);
(Continued)

(58) Field of Classification Search
CPC ........... C22B 1/00; C22B 11/00; C22B 15/00; G02B 27/0101; G02B 21/008;
(Continued)

(56) References Cited

U.S. PATENT DOCUMENTS 4,560,541 A    12/1985   Davis
4,578,255 A    3/1986   Roe et al.
(Continued)

FOREIGN PATENT DOCUMENTS

AU        526786 B2    2/1983
CA        988225 A      4/1976
(Continued)

OTHER PUBLICATIONS

Zheng Zhou, Single Mineral Separation, Guangdong Science and Technology Press, 1st edition, p. 138, (3 pages of Official & 3 pages of English Translation), 1997.

(Continued)

*Primary Examiner* — Zulmariam Mendez
(74) *Attorney, Agent, or Firm* — Kagan Binder, PLLC

(57) ABSTRACT

Disclosed herein are methods and compositions for increasing the alumina content of a bauxite ore prior to alumina extraction by an extractive process, such as the Bayer process. By adding a beneficiation agent to an aqueous ore slurry, then applying a gravitational force to separate, or partition, the slurry into a beneficiary and a gangue, a number of quantifiable benefits are observed. These include increased alumina content and reduced silica content in the beneficiary solids as compared to the starting ore. These benefits are in excess of those observed by pre-extraction gravitational separation of ore slurries without the addition of a beneficiation agent. Beneficiation agents include DADMAC polymers, and combinations of DADMAC poly- (Continued)

mers with dextrans. The beneficiary is collected and applied to an extractive process, such as the Bayer process.

18 Claims, 1 Drawing Sheet

(51) Int. Cl.
| | |
|---|---|
| C22B 1/00 | (2006.01) |
| C22B 11/00 | (2006.01) |
| C22B 15/00 | (2006.01) |
| G02B 27/01 | (2006.01) |
| G06F 3/01 | (2006.01) |
| G06V 20/10 | (2022.01) |
| G09B 21/00 | (2006.01) |

(52) U.S. Cl.
CPC .......... *G02B 27/0101* (2013.01); *G06F 3/013* (2013.01); *G06V 20/10* (2022.01); *G09B 21/008* (2013.01); *G02B 2027/0138* (2013.01); *G02B 2027/014* (2013.01); *G02B 2027/0178* (2013.01)

(58) Field of Classification Search
CPC ...... G02B 2027/0138; G02B 2027/014; G02B 2027/0178
See application file for complete search history.

(56) References Cited

U.S. PATENT DOCUMENTS

| | | | |
|---|---|---|---|
| 4,971,685 | A | 11/1990 | Stanley et al. |
| 5,041,269 | A | 8/1991 | Moody et al. |
| 5,049,612 | A | 9/1991 | Bulatovic et al. |
| 5,106,599 | A | 4/1992 | Roe |
| 5,217,620 | A | 6/1993 | Mahoney et al. |
| 5,284,634 | A | 2/1994 | Strominger et al. |
| 5,476,522 | A | 12/1995 | Kerr et al. |
| 6,527,959 | B1 | 3/2003 | Quadir et al. |
| 6,726,845 | B1 | 4/2004 | Barham et al. |
| 8,349,188 | B2 | 1/2013 | Soane et al. |
| 9,199,855 | B2 | 12/2015 | Urbani et al. |
| 10,793,444 | B2 | 10/2020 | LaRosa et al. |
| 2008/0107578 | A1 | 5/2008 | Wang et al. |
| 2011/0131873 | A1* | 6/2011 | Soane ............... C02F 1/004 210/207 |
| 2014/0110621 | A1 | 4/2014 | Kerns et al. |
| 2019/0092646 | A1* | 3/2019 | LaRosa ............ C01F 7/0613 |

FOREIGN PATENT DOCUMENTS

| | | |
|---|---|---|
| CN | 1947850 A | 4/2007 |
| CN | 101249475 A | 8/2008 |
| CN | 101913615 B | 12/2010 |
| EP | 1157727 A1 | 11/2001 |
| WO | 90/09349 A1 | 8/1990 |
| WO | 2017/062200 A1 | 4/2017 |
| WO | 2018/045025 A1 | 3/2018 |
| WO | 2019/067433 A1 | 4/2019 |

OTHER PUBLICATIONS

Kaiqi Li et al., Deep processing technology for weathered kaolin, China Building Materials Press, 1st edition, p. 121, (3 pages of Official & 4 pages of English Translation), 2017.

Lihuang Huang, Chemical Beneficiation, Metallurgical Industry Press, 2nd edition, p. 111, (3 pages of Official & 4 pages of English Translation), 2012.

Hu Yue-hua et al., "Effect of hydroxamic acid starch on reverse flotation desilicate from diasporic bauxite", Trans. Nonferrous Met. Soc. China, vol. 12, No. 5, pp. 974-978, Oct. 2002.

Office Action issued in China Patent Application No. 201880062523.5, mailed on Feb. 18, 2022, 29 pages (17 pages English Translation & 12 pages Official).

International Search Report for International Application No. PCT/US2019/052554, mailed on Dec. 11, 2019, 6 pages.

Written Opinion for International Application No. PCT/US2019/052554, mailed on Dec. 11, 2019, 6 pages.

Liu et al., "The role of cationic polyacrylamide in the reverse flotation of diasporic bauxite", Minerals Engineering, vol. 20, No. 13, Sep. 26, 2007, pp. 1191-1199.

Massola et al., "Separation of silica from bauxite via froth flotation", Mineral Engineering, vol. 22, No. 4, Mar. 1, 2009, pp. 315-318.

Vadim Smirnov, "Alumina Production in Russia Part I", retrieved from http://www.tms.org/pubs/journals/jom/9608/smirnov9608.html, accessed on May 10, 2017, Journal of Minerals, 48(8), 1996, pp. 24-26.

Buntenbach et al., "Beneficiation of Bauxite—Upgrading of Recoverable AI2O3", AKW Apparate+Verfahren GmbH, Germany, 6 pages, International Committee for Study of Bauxite, Alumina & Aluminium 2010.

International Search Report for International Application No. PCT/US2018/052616, mailed on Jan. 4, 2019, 6 pages.

Written Opinion for International Application No. PCT/US2018/052616, mailed on Jan. 4, 2019, 9 pages.

* cited by examiner

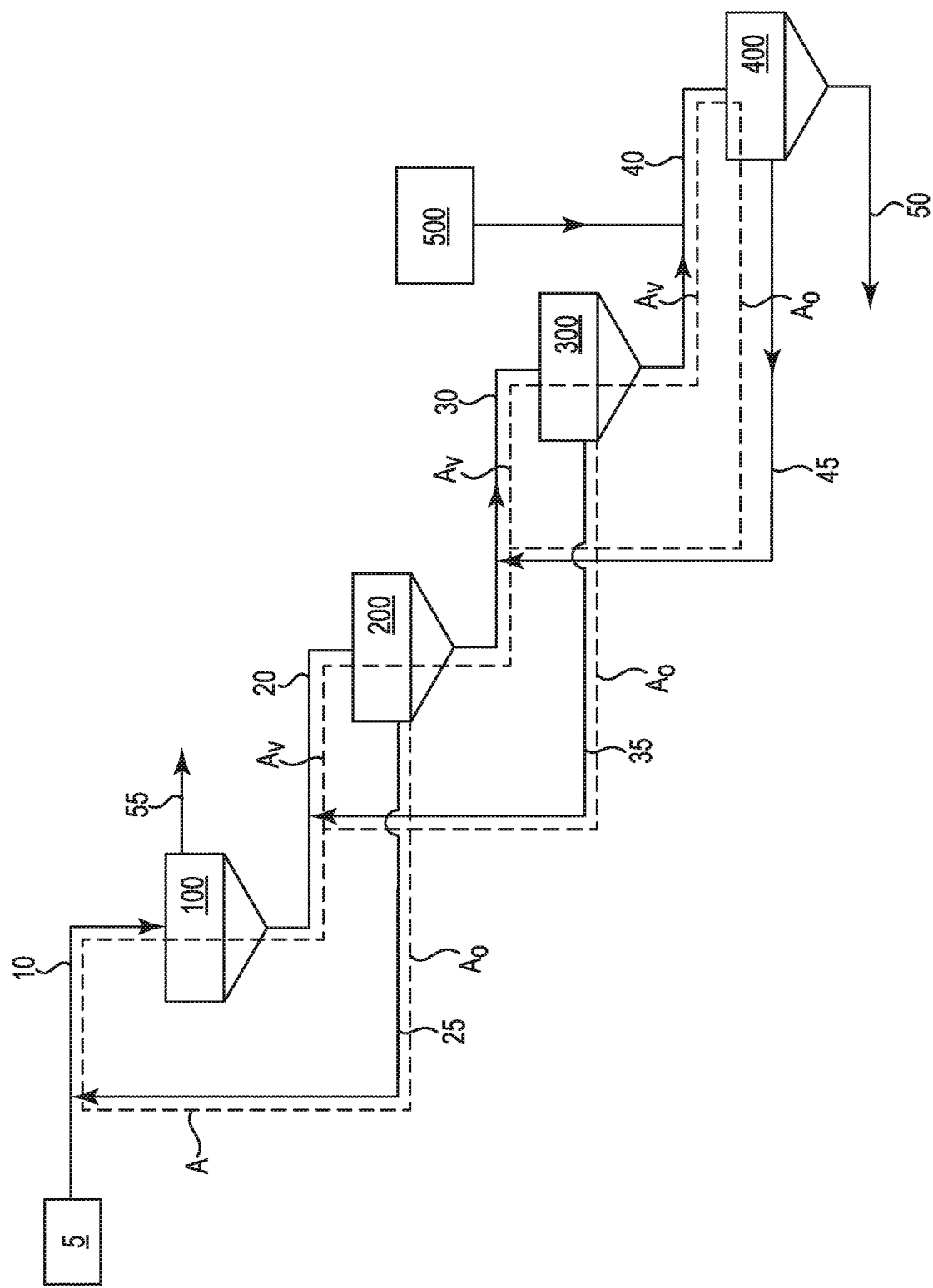

METHODS AND COMPOSITIONS FOR PRE-EXTRACTIVE BENEFICIATION OF ORES

BACKGROUND

Useful and valuable mineral products such as gold, silver, copper, iron, aluminum, coal, and the like are obtained by mining ores from the earth, then separating the desired product from the surrounding rock matrix. In order to obtain the desired mineral product, ores are subjected to one or more post-mining processes that exploit the physicochemical differences in the ore components in order to obtain separation. For example, bauxite, an alumina-containing are and the world's principal source of aluminum metal, is commercially subjected to the Bayer process, which is the chemical extraction of alumina by digestion of the ore in caustic followed by separation of dissolved aluminate species. Autoclaving and sintering type extractions of bauxite are also employed; these are described in Smirnov, V., JOM 48(8), 24-46 (1996). Other commercially significant ore separation processes include extraction of gold ores with sodium cyanide.

In some cases, prior to extractive processing, an ore is subjected to one or more processes designed to separate an ore product enriched in the desired mineral product, from an ore product depleted in the desired mineral product. Such processes improve the efficiency of the subsequent extraction; and in some cases, the reduction in impurities includes a reduction in one or more species that chemically interfere with a subsequent extraction process. Such pre-extraction processing may be referred to as "beneficiation". An ore product enriched in the desired mineral product may be referred to as the "beneficiary." An ore product depleted in the desired mineral product may be referred to as "gangue". The beneficiary is applied to extractive processing, with the result that the efficiency of the extraction process is increased compared to the use of ores without such pre-extraction processing. The gangue, which often includes an increased concentration of silicic species compared to the beneficiary, may be discarded; or it may be subjected to further beneficiation or other pre-extractive processing to further separate and obtain additional beneficiary to pass on to extraction. Silicic species include silica, silica-containing compounds, and silicates including but not limited to quartz, kaolinite, and clays (aluminosilicates).

One industrially useful method of beneficiation includes comminution of an ore, followed by screening to classify the ore particulate into "fines" and larger particles that require further comminution; the fines are slurried with water and the slurry is applied to a gravity-based separation process such as settling, countercurrent flow, or hydrocycloning to separate the slurry into a beneficiary and a gangue. Inherent density differences between the comminuted ore particles bearing a higher concentration of the desired mineral product, and other comminuted ore particles having a lower concentration lead to the result of beneficiation. The beneficiary is collected and applied as the starting material in an extractive process.

While the use of gravitational separation has delivered a modest improvement in some parameters such as an increase in weight ratio of desirable mineral product, there has been a paucity of pre-extractive treatment materials and methods for further improving the "quality" of beneficiaries applied to one or more subsequent extractive processes. Further, there is a present trend and additional desire in the industry to use lower grade ores, such as ores having higher concentrations of impurities such as silicates, lower concentrations of the desired mineral product, lower concentrations of available—that is, extractable—mineral product, or both. As the industry trends to lower and lower quality ores, such conventional pre-extractive processing may be insufficient to provide an economically satisfactory quality beneficiary for extraction.

For example, a low grade bauxite ore may have an alumina:silica ratio as low as about 2 and kaolinite content as high as 15 wt %. Conventional bauxite beneficiation methods may be incapable of producing a beneficiary containing 3 wt % kaolinite or less and/or an alumina:silica ratio of 10 or greater when starting from such ore sources. Mineral products that are scarcer, such as gold, represent a challenging situation for low-grade ores. In the case of gold, for example, it is economically feasible to subject ores having less than 1 weight percent of gold, and even as low as 1 ppm or even 100 ppb by weight of gold to an extractive process. The relative scarcity of gold translates to an expectation that even lower grade ores will be mined and processed to isolate it in the future. The potential benefits of increasing the effective weight percent of extractable product in an ore are clear in the case of gold, but other desirable mineral products such as iron, copper, silver, and coal in addition to aluminum are presently being extracted from increasingly poorer grade ores on account of global depletion of ore sources. Such ore sources might be made useful sources of one or more desired mineral products with effective pre-extractive beneficiation.

The industry lacks technically and economically viable solutions for increasing the weight ratio of a desired mineral product in an ore source prior to extractive processing of the ore source. There is a need in the industry to increase the weight percent of extractable mineral product in an ore source prior to extractive processing of the ore source. There is a need in the industry to decrease the weight percent of undesirable materials, that is, materials without commercial value, in an ore source prior to extractive processing of the ore source. There is a need in the industry for such processes in particular to address low grade ores. There is a need in the industry to reduce or remove silicates from ore sources prior to extractive processing of the ore source. And there is a need in the industry to maximize the utility of dwindling global ore reserves.

The foregoing needs are addressed by the compositions and methods described herein.

DESCRIPTION OF THE DRAWINGS

FIG. 1 is a schematic diagram of a countercurrent flow separation or partitioning apparatus.

SUMMARY OF THE INVENTION

Accordingly, disclosed herein are methods of ore beneficiation, the methods comprising: combining an ore source, a water source, and a beneficiation agent to form a first beneficiation slurry; applying a first gravitational force to the first beneficiation slurry to partition the slurry into a first beneficiary and a first gangue, wherein the beneficiation agent comprises a cationic polymer. In embodiments, the method further includes collecting the beneficiary, and one or more of flocculating the beneficiary, drying the beneficiary, and applying the beneficiary to an extractive process. The beneficiation agent comprises, consists essentially of, or consists of a cationic polymer. As used herein, the term "cationic polymer" means a polymerized compound having two or more repeat units covalently bonded to each other, further wherein at least one of the repeat units includes a cationic moiety covalently bonded thereto. The cationic polymer is synthetic, or derived from natural sources, or is a synthetically modified polymer derived from natural sources. In embodiments, the cationic moiety is amine or ammonium. The cationic polymer may also include anionic moieties, such as carboxylate or sulfonate moieties covalently bonded thereto, as long as the number of amino or cationic moieties covalently bonded to the polymer is greater than the number of anionic moieties covalently bonded to the polymer. Stated differently, the net ionic charge of all ionic moieties covalently bonded to the cationic polymer must be +1 or greater. In some embodiments, the cationic polymer is crosslinked. In some embodiments, the cationic polymer is a combination of two or more different cationic polymers.

In embodiments, the beneficiation agent further comprises a second polymer, wherein the second polymer is a polysaccharide. Suitable polysaccharides include dextran, chitosan, guar, carageenan, xanthan, cellulose, various plant-based starches, chemically modified (functionalized) versions of these, crosslinked versions of any of the foregoing, and combinations of my of the foregoing. The polysaccharide is sourced from plant or animal products. In embodiments where the beneficiation agent comprises a second polymer, the weight ratio of cationic polymer to polysaccharide in the beneficiation agent is about 1000:1 to 1:100.

In embodiments, the beneficiation agent is added in amount corresponding to about 0.01 gram to 10 grams beneficiation agent per kg of the ore source. In embodiments, the ore source is a comminuted ore source or a classified ore source. In embodiments, the ore source comprises one or more mineral products selected from gold, silver, copper, molybdenum, iron, aluminum, coal, and phosphate. In embodiments, the ore source is an ore having gold, copper or aluminum In embodiments, the first gravitational force is a central force. In embodiments, the central force is about 1.1 g to 1000 g (1 g=9.8 meters per second per second). In other embodiments, the applied gravitational force is 1 g. In still other embodiments, the applied gravitational force is about 1 g and the method further includes a countercurrent flow.

In embodiments, a first beneficiary includes about 1 wt % to 10 wt % more total mineral product than a beneficiary obtained using the same methodology but excluding the beneficiation agent: that is, a beneficiary obtained using a water source that excludes the beneficiation agent. In embodiments, the first beneficiary includes about 3 wt % to 10 wt % more available (extractable) mineral product than a beneficiary obtained using the same methodology but excluding the beneficiation agent. In embodiments, the first beneficiary is applied to an extractive process.

In embodiments, applying centrifugal force is applying a first beneficiation slurry to a first hydrocyclone, wherein the first beneficiary is a first underflow, and the first gangue is a first overflow. In embodiments, the methods further comprise applying the first gangue to a second hydrocyclone to obtain a second beneficiary and a second gangue. In embodiments, the second beneficiary is combined with the first beneficiary. In embodiments, the combined first and second beneficiaries are applied to an extractive process.

In embodiments, applying centrifugal force is applying a first beneficiation slurry to a first hydrocyclone, wherein the first beneficiary is a first overflow, and the first gangue is a first underflow. In embodiments, the methods further comprise applying the first gangue to a second hydrocyclone to obtain a second beneficiary and a second gangue. In embodiments, the second beneficiary is combined with the first beneficiary. In embodiments, the combined first and second beneficiaries are applied to an extractive process.

In embodiments, applying 1 g force is applying a first beneficiation slurry to a first countercurrent flow, wherein the first beneficiary is a first underflow, and the first gangue is a first overflow. In embodiments, the methods further comprise applying the first gangue to a second countercurrent flow to obtain a second beneficiary and a second gangue. In embodiments, the second beneficiary is combined with the first beneficiary. In embodiments, the combined first and second beneficiaries are applied to an extractive process.

In embodiments, applying 1 g force is applying a first beneficiation slurry to a first countercurrent flow, wherein the first beneficiary is a first overflow, and the first gangue is a first underflow. In embodiments, the methods further comprise applying the first gangue to a second countercurrent flow to obtain a second beneficiary and a second gangue. In embodiments, the second beneficiary is combined with the first beneficiary. In embodiments, the combined first and second beneficiaries are applied to an extractive process.

Also disclosed herein is the use of a cationic polymer to increase available (i.e. extractable) mineral product content of an ore source prior to extractive processing. In embodiments, the use includes us of an applied force to partition an ore slurry. In embodiments the applied force is a central force that is greater than 1 g, such as 1.1 g to 10 g. In other embodiments, no applied force is used, that is, only gravitational force is applied. In some such embodiments, the partitioning is accomplished by using a countercurrent flow of water without application of force in excess of gravitational force. Each such use contemplates use of an ore slurry comprising a cationic polymer. In embodiments, the beneficiation further comprises the use of a second polymer that is a polysaccharide.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, "ore", "ore source" and like terms refer to solid rock materials mined from one or more subterranean excavations, wherein the ore contains an extractable amount of a mineral product within (blended with, surrounded by, or intimately mixed with) a solid rock matrix, for example about 0.01 wt % to 50 wt % of a mineral product based on the weight of the ore. The ore is not processed by any extractive process. In embodiments the ore is part of an ore slurry or a beneficiation slurry. In embodiments the ore is "as-mined" ore, or "raw" ore, which is the solid rock produced by mining operations without further modification. In embodiments the ore is a "comminuted ore", which is the raw ore after one or more comminution processes such as milling and grinding. In embodiments the ore is a "classified ore", which is a comminuted ore that is further separated according to particle size, such as by a screening process, further wherein the classification is conducted substantially in the absence of a liquid.

As used herein, the term "mineral product" means a valuable commercial material that is either present in an ore source or obtained therefrom. Mineral products include but are not limited to gold, silver, copper, iron, aluminum, coal, phosphate, molybdenum, and combinations of these.

As used herein, the term "ore slurry" and similar terms means a combination of water with a comminuted ore or a classified ore, in the absence of or substantially in the absence of a beneficiation agent.

As used herein, the term "cationic polymer" means a polymerized compound having two or more repeat units covalently bonded to each other, further wherein at least one of the repeat units includes a cationic moiety covalently bonded thereto and further wherein the polymer has a net cationic charge. Stated differently, the net ionic charge of all ionic moieties covalently bonded to the cationic polymer must be +1 or greater. The cationic polymer is synthetic, or derived from natural sources, or is a synthetically modified polymer derived from natural sources. In embodiments, the cationic moiety is amine or ammonium. The cationic polymer may also include anionic moieties, such as carboxylate or sulfonate moieties covalently bonded thereto, as long as the number of amino or cationic moieties covalently bonded to the polymer is greater than the number of anionic moieties covalently bonded to the polymer. In some embodiments, the cationic polymer is crosslinked. In some embodiments, the cationic polymer is a combination of two or more chemically different cationic polymers; chemical differences include one or more of: molecular weight, an average molecular weight, repeat unit chemistry/structure, degree of branching, degree of crosslinking, net charge of the polymer.

As used herein, "extraction", "extractive process", and like terms refer to one or more processes that chemically separate one or more mineral products from the surrounding rock matrix of an ore. The extraction may be physicochemical, electrochemical, or combinations thereof.

As used herein, the term "pre-extraction" and like terms applied to methods and processing steps generally indicates methods and processing steps carried out prior to extraction of an ore. Pre-extraction processing includes comminution, classification, and beneficiation.

As used herein, the term "beneficiation" means pre-extractive processing of an ore slurry to obtain a beneficiary. In embodiments, beneficiation includes partitioning. In some embodiments, beneficiation includes collecting a beneficiary, flocculating a beneficiary, one or more additional process steps, or a combination of two or more thereof.

As used herein, the term "beneficiary" means an ore product of one or more beneficiation processes. The beneficiary is a type of ore; that is, the desired mineral product has not been chemically separated (extracted) from the rock matrix. However, the beneficiary is enriched in the mineral product when compared to a raw ore, a comminuted ore, or a classified ore. The beneficiary has at least one of the following features or properties, noting that weight percentages refer to percent of solids and not percent of a slurry: the total weight percent of mineral product in the beneficiary is greater than the total weight percent of mineral product in the ore, including the comminuted and/or classified ore; the weight percent of available or extractable mineral product in the beneficiary is greater than the weight percent of available or extractable mineral product in the ore, including the comminuted and/or classified ore; the total weight percent of silica in the beneficiary is less than the total weight percent of silica in the ore, including the comminuted and/or classified ore; the weight ratio of total mineral product to total silica in the beneficiary is greater than the weight ratio of total mineral product to total silica in the ore, including the comminuted and/or classified ore. In embodiments the beneficiary is suitable for or is subsequently applied to an extractive process. In some embodiments, the beneficiary is included in, or is part of, a slurry. In some embodiments the beneficiary is a flocculated solid obtained from a slurry. In some embodiments the beneficiary is a dewatered solid obtained from a slurry.

As used herein, the term "beneficiation slurry" means a combination of an ore source, a water source, and a beneficiation agent. A beneficiation slurry is formed by combining an ore source, a water source, and a beneficiation agent. A beneficiation agent is used by contacting the beneficiation agent with an ore source, a water source, or an ore slurry, wherein the contact results in gravitational separation of a beneficiary from a gangue. Gravitational separation of the beneficiation slurry results in formation of a beneficiary and a gangue.

As used herein, the term "gangue" means an ore product of one or more beneficiation processes that is depleted in a mineral product as compared to the raw ore, comminuted ore, or classified ore. In some embodiments, the gangue is included in, or is part of, a slurry. In embodiments a gangue is formed by a first beneficiation process, and is suitable for or is subsequently applied to a second beneficiation process.

As used herein, the terms "partition", "separation", and like terms refer to the use of a gravitational force to partition a beneficiation slurry into a beneficiary and a gangue. Gravitational force includes forces based on the constant of proportionality, g, where 1 g is equal to 9.8 meters per second per second, which is approximately the force of gravity at the Earth's surface. In embodiments, the gravitational force is 1 g. In other embodiments, gravitational force is applied to a system, that is, a force in excess of 1 g. In some such embodiments partitioning is achieved by applying a central force, wherein the separation is a centrifugal separation. Centrifugal separation includes centrifuge and hydrocyclone separation.

As used herein, the term "silica", "silcic specie", "silicate" or similar terms in singular or plural indicate at least one of the following is present in, or is obtained from, an ore source, further as determined by context: one or more silicon dioxide repeat units; a compound or material including one or more silicon dioxide repeat units or functionalities; a silicate or aluminosilicate including but not limited to quartz, kaolinite, and clays. In embodiments, the silica is kaolinite; in other embodiments the silica is clay. In embodiments, two or more silicic species are present in or obtained from an ore.

As used herein, the terms "underflow" and "overflow" refer to the partitioned ore slurry products, wherein "underflow" refers to the lower partitioned phase, and "overflow" refers to the upper partitioned phase In embodiments an underflow comprises or consists essentially of a beneficiary.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of" as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

Described herein are methods of ore beneficiation, wherein an ore becomes enriched in a mineral product prior to chemical separation, or extraction, of the mineral product from the surrounding rock matrix. Pre-extraction treatment of ores to enrich the ore's content of a desirable mineral product is referred to herein as "beneficiation" and such pre-extractive processing results in a "beneficiary." Thus, described herein are methods of beneficiation, wherein the methods provide one or more of the following benefits over conventional beneficiation: increased total weight percent of mineral product in the beneficiary, increased weight percent of extractable mineral product in the beneficiary, decreased total weight of silica in the beneficiary; or both increase weight percent of extractable mineral product and decreased total weight of silica in the beneficiary. The beneficiation methods are also effective for reducing the concentration of silicic species in an ore source, in particular kaolinite and aluminosilicate clays. These silicic species are commonly implicated as negatively impacting ore processing after beneficiation—for example by "using up" reagents, interfering with separations, causing instabilities, and generally lowering process efficiency. The benefits listed above are obtained for the ore as a starting material, the ore after comminuting, the ore after classifying, the ore after ore slurry formation, and/or the ore after ore slurry formation followed by beneficiation but excluding the beneficiation agents described below.

The methods comprise forming a beneficiation slurry comprising, consisting essentially of, or consisting of an ore source, water, and a beneficiation agent; and partitioning the beneficiation slurry into a beneficiary and a gangue. In embodiments, the method further comprises collecting the beneficiary. In embodiments the method includes applying a central force. In embodiments the method includes applying the slurry to a countercurrent flow.

The ore source is any solid rock material mined from one or more subterranean excavations and containing a commercially valuable amount of a mineral product. The ore source is not yet processed by a extractive process. The "commercially valuable amount" refers to the mineral product and its present value in the global marketplace. In embodiments the ore is "as-mined" ore, which is the rock product produced by mining operations without further modification. In embodiments the ore is a "comminuted ore", which is the as-mined ore after one or more comminution processes such as milling and grinding. In embodiments the ore is a "classified ore", which is a comminuted ore that is further separated according to particle size, such as by a screening process, further wherein the classification is conducted substantially in the absence of a liquid.

Classified ores are the most common type of ore source employed in beneficiation processes. The purpose of classification is to provide a particulate of appropriate size for one or more beneficiation steps. However, the methods described herein are not particularly limited as to particle size range or average particle size of a comminuted ore, and classification is not necessary to obtain the benefits of the presently described methods. Therefore, in some embodiments classification of a comminuted ore is suitably excluded from the methods described.

In embodiments, classification is carried out by contacting a comminuted ore with a screen, such that the ore particles passing through the screen are collected for beneficiation and the larger particulates are subjected to one or more additional comminution steps. In embodiments, the classified ore is classified while substantially dry, that is, in the absence of or substantial absence of liquid water. A common method of classification employed for ores is to pass a comminuted ore through a series of screens of decreasing mesh size, and select one or more captured ore particle size ranges retained by one or more of the screens. In embodiments, screening methods of classification are also employed to determine the average particle size range of a particulate, for example by weighing the fractions of ore particulate retained on the various mesh screens and determining an average particle size based on weight distribution. One or more classified ores are suitably employed in an ore slurry for purposes of beneficiation according to the presently described methods.

In embodiments, an average particle size of a classified ore is between about 150 mm and 0.1 μm, for example about 100 mm to 1 μm, or about 50 mm to 1 μm, or about 30 mm to 1 μm, or about 20 mm to 1 μm, or about 10 mm to 1 μm, or about 50 mm to 10 μm, or about 50 mm to 100 μm, where such values and ranges are dictated by the classification methodology employed. In embodiments, the average particle size is "D50", or d50, or average particle diameter by mass. Where not otherwise specified, the value of D50 particle size is determined by a screening classification method. However, other methods may be used to determine an average particle size, including D50 particle size; such methods include for example light scattering methods or liquid-based size exclusion methods.

An ore source is combined with a water source to form an ore slurry. Generally, the ore slurry includes about 1 wt % to 50 wt % ore, with the balance of the slurry (50 wt % to 99 wt %) being the water source. In embodiments, the ore slurry includes about 5 wt % to 50 wt %, or about 10 wt % to 50 wt %, or about 15 wt % to 50 wt %, or about 20 wt % to 50 wt %, or about 10 wt % to 40 wt %, or about 10 wt % to 30 wt % ore, with the balance being a water source. The water source is water, tap water, connate, seawater, fresh water, industrial wastewater from one or more mining operations, or another source. The ore source is a solid mined from the earth that comprises an extractable amount of a mineral product within a solid rock matrix.

Suitable ores include gold ore, silver ore, copper ore, iron ore, coal ore, phosphate ore, and molybdenum ore.

An ore source, a water source, and a beneficiation agent are combined to form a beneficiation slurry. In embodiments, an ore source is combined with a beneficiation agent prior to formation of a beneficiation slurry. In embodiments, an ore slurry is combined with a beneficiation agent to form a beneficiation slurry. In embodiments, a water source is mixed with a beneficiation agent, and the mixture is combined with an ore source or an ore slurry to form a beneficiation slurry. A beneficiation slurry comprises, consists essentially of, or consists of an ore source, a water source, and a beneficiation agent. The components of the beneficiation slurry may be added in any order to each other, such order including but not limited to: repeated or continuous additions of any one or more components of the beneficiation slurry in any order within one or more beneficiation processes (for example to adjust concentrations or maintain a continuous process) or prior to the beneficiation process (for example by applying the dry powder beneficiation agent to the ore source); addition of beneficiation agent components to the beneficiation slurry components in any order; and combinations thereof. In embodiments, the total amount of beneficiation agent in the beneficiation slurry is measured based on weight of ore in the slurry. In embodiments, an industrial process involves two or more beneficiation processes wherein two or more beneficiaries are formed from a single beneficiation slurry; or two or more beneficiaries are formed from two or more beneficiation slurries. Where two or more beneficiation slurries are formed, two or more discrete additions of beneficiation agent are suitably employed. Any such processes are suitably batch or continuous processes.

In embodiments, the beneficiation agent comprises, consists essentially of, or consists of a cationic polymer. In embodiments, the beneficiation agent comprises, consists essentially of, or consists of a polysaccharide. In embodiments, the beneficiation agent comprises, consists essentially of, or consists of a cationic polymer and a polysaccharide. In some embodiments, the cationic polymer comprises, consists essentially of, or consists of a homopolymer or a copolymer of a monomer bearing a cationic charge covalently bonded thereto. In other embodiments, the cationic polymer comprises, consists essentially of, or consists of a homopolymer or a copolymer of a monomer that is subjected to post-polymerization quaternization of amine-functional residues or repeat units to yield one or more ammonium-functional residues or repeat units. In some embodiments, the cationic monomer is selected from diallyldimethylammonium chloride (DADMAC) and quaternized amino functional acrylates or acrylamides, such as methacrylamidopropyltrimethylammnonium chloride or 2-(acryloyloxy)-N,N,N-trimethylethanammonium chloride. In some embodiments, the cationic polymer is characterized by a molecular weight of about 300 g/mol to $1 \times 0^6$ g/mol, when the molecular weight is measured by gel permeation chromatography. In some embodiments, the cationic polymer is characterized by a molecular weight of about 300 g/mol to $1 \times 10^6$ g/mol, when the molecular weight is measured by intrinsic viscosity techniques familiar to those of skill.

In embodiments, the cationic polymer includes one or more anionic monomer residues such as those bearing carboxylate, phosphonate, or sulfonate moieties covalently bonded thereto, wherein the total or net charge of the polymer is +1 or greater. Stated differently, the sum of anionic and cationic moieties bonded to the polymer is +1 or greater. In one or more of the foregoing embodiments, the cationic polymer includes one or more nonionic monomer residues such as those bearing amide, imide, ester, ether, olefinic, or other moieties covalently bonded thereto, wherein the total or net charge of the polymer is +1 or greater.

In some embodiments, the polysaccharide is selected from include dextran, chitosan, guar, carrageenan, cellulose, pullulan, xanthan, alginate, and various plant-based starches; chemically modified (functionalized) versions of these; crosslinked versions of any of the foregoing; and combinations of any of the foregoing. In embodiments the polysaccharide is a mixture of different polysaccharides obtained from different sources and thus have different physicochemical properties such as molecular weight, degree of branching, and the like. In some embodiments, the polysaccharide is crosslinked. In some embodiments, the polysaccharide is chemically modified by one or more thermochemical reactions such as crosslinking or functionalization, for example carboxymethylation. In some embodiments, the polysaccharide is chemically modified by post-collection enzymatic conversion. In some embodiments the polysaccharide is also characterized as a cationic polymer, for example in the case of chitosan.

In embodiments, the beneficiation slurry comprises, consists essentially of, or consists of an ore source, a water source, and a polysaccharide. In embodiments, the beneficiation slurry comprises, consists essentially of, or consists of an ore source, a water source, and a cationic polymer and a polysaccharide. In embodiments, the polysaccharide is a chitosan, a dextran, or a carrageenan. The molecular weight of polysaccharides suitably employed in the methods described herein are not particularly limited, and generally are determined by the natural product from which the polymer is obtained. In embodiments, the polysaccharide is crosslinked.

Polysaccharides useful as beneficiation agents either alone or when combined with a cationic polymer generally have an uncrosslinked weight average molecular weight calculated or measured to be about 5,000 g/mol to $1 \times 10^7$ g/mol, for example about 10,000 g/mol to $1 \times 10^6$ g/mol, or about 20,000 g/mol to $1 \times 10^6$ g/mol, or about 30,000 g/mol to $1 \times 10^6$ g/mol, or about 40,000 g/mol to $1 \times 10^6$ g/mol, or about 60,000 g/mol to $1 \times 10^6$ g/mol, or about 80,000 g/mol to $1 \times 10^6$ g/mol, or about 100,000 g/mol to $1 \times 10^6$ g/mol, or about 200,000 g/mol to $1 \times 10^6$ g/mol, or about 300.00 g/mol to $1 \times 10^6$ g/mol, or about 10,000 g/mol to 900,000 g/mol, or about 10,000 g/mol to 800,000 g/mol, or about 10,000 g/mol to 700.000 g/mol, or about 10,000 g/mol to 600,000 g/mol, or about 10,000 g/mol to 500,000 g/mol, or about 10,000 g/mol to 400,000 g/mol, or about 10,000 g/mol to 300,000 g/mol, or about 10,000 g/mol to 200,000 g/mol. In some embodiments the polysaccharide is functionalized, such as by carboxymethylation or acetylation; in some embodiments, the polysaccharide is crosslinked.

In embodiments, the beneficiation agent is added to an ore slurry in an amount corresponding to at least about 10 grams per 1000 kg ore, in embodiments as much as 1 kg per 1000 kg ore, for example about 0.01 gram to 1 gram beneficiation agent per kg ore, or about 0.02 gram to 1 gram, or about 0.03 gram to 1 gram, or about 0.04 gram to 1 gram, or about 0.05 gram to 1 gram, or about 0.06 gram to 1 gram, or about 0.07 gram to 1 gram, or about 0.08 gram to 1 gram, or about 0.09 gram to 1 gram, or about 0.01 gram to 0.9 gram, or about 0.01 gram to 0.8 gram, or about 0.01 gram to 0.7 gram, or about 0.01 gram to 0.6 gram, or about 0.01 gram to 0.5 gram, or about 0.01 gram to 0.4 gram, or about 0.01 gram to 0.3 gram, or about 0.01 gram to 0.2 gram beneficiation agent per kg ore. The beneficiation agent is suitably added to an ore slurry "neat", that is, as a substantially 100% dry powder, and dissolved in the slurry to form a beneficiation slurry. Alternatively, a beneficiation agent solution or dispersion in water is formed, and the solution or dispersion is added to an ore slurry to form a beneficiation slurry. The concentration of such a solution or dispersion is not particularly limited and is adjusted for the ease of use and convenience of the operator in applying the beneficiation agent. However, such concentration may suitably range between about 0.1 gram beneficiation agent per 100 ml water to 100 gram beneficiation agent per 100 ml water.

The beneficiation agent, or the components thereof, are suitably added to an ore slurry in any order to form a beneficiation slurry; or are added to the water source that is then used to form the beneficiation slurry. In embodiments the beneficiation agent is available as 100% solids, e.g. a powdered or particulate form; in such cases, a user may add the powdered beneficiation agent directly to an ore slurry to form a beneficiation slurry. In embodiments an aqueous solution of the beneficiation agent is formed and the solution is added to the ore or to an ore slurry to form a beneficiation slurry. In embodiments the cationic polymer is added to the slurry and then polysaccharide is added to the slurry; in other embodiments, polysaccharide is added to the slurry and then the cationic polymer is added to the slurry; in still other embodiments, the cationic polymer and the polysaccharide are combined, then added to the slurry contemporaneously; such addition may be a single addition, continuous addition, batchwise addition, and the like.

In embodiments where the beneficiation agent comprises, consists essentially of, or consists of a cationic polymer and a polysaccharide, (whether or not these polymers are combined prior to contact with an ore source or with an ore slurry), the weight ratio of the cationic polymer to the polysaccharide is about 1000:1 to 1:100, for example about 1000:1 to 1:10, or about 1000:1 to 1:7, or about 1000:1 to 1:5, or about 1000:1 to 1:3, or about 1000:1 to 1:1, or about 100:1 to 1:100, or about 100:1 to 1:10, or about 100:1 to 1:7, or about 100:1 to 1:5, or about 100:1 to 1:3, or about 100:1 to 1:1, or about 10:1 to 1:100, about 10:1 to 1:10, about 10:1 to 1:7, about 10:1 to 1:5, or about 10:1 to 1:3, or about 10:1 to 1:1, or about 7:1 to 1:7, or about 5:1 to 1:5, about 3:1 to 1:3, or about 1:1 to 1:3.

One conventional method of beneficiation includes comminution of an ore source, followed by classification of the comminuted ore by screening to provide "fines" (particles of a selected average particle size or less) and larger particles that require further comminution. The fines are slurried with water and the slurry is applied to a hydrocyclone to partition the slurry into an underflow and an overflow. The underflow includes an ore particulate having a reduced amount of silica, an increased amount of extractable mineral product, or both. In embodiments, silicic species are reduced in the underflow by at least 10 wt %, for example 10 wt % to 50 wt %, or 10 wt % to 45 wt %, or 10 wt % to 40 wt %, or 10 wt % to 35 wt %, or 10 wt % to 30 wt %, or 10 wt % to 25 wt %, or 10 wt % to 20 wt %, or 15 wt % to 50 wt %, or 20 wt % to 50 wt %, or 25 wt % to 50 wt %. In embodiments, aluminosilicates (a silicic species also referred to as "clay") is reduced in the underflow by at least 10 wt %, for example 10 wt % to 30 wt %, or 10 wt % to 25 wt %, or 10 wt % to 20 wt %, or 15 wt % to 30 wt %, or 20 wt % to 30 wt %, or 25 wt % to 30 wt %.

In embodiments, the overflow includes a reduced size class of particulate termed "superfines", which may be further processed to improve the overall efficiency of hydrocyclone partitioning. In embodiments the underflow is flocculated to reduce water content prior to extractive processing. The underflow, optionally with reduced water content and optionally further combined with one or more additional ore slurry underflow products, is applied as the starting material in an extractive process.

Accordingly, a method of beneficiation includes comminution of an ore source, followed by classification of the comminuted ore; then combining the classified ore with a water source and a beneficiation agent to form a beneficiation slurry; the beneficiation slurry is partitioned, or separated, by a gravitational force to form a beneficiary and a gangue. In embodiments, the gravitational force is a central force and the gravitational separation is a centrifugal separation. In embodiments, centrifugal separation includes applying a force greater than 1 g to the beneficiation slurry to partition the slurry into a beneficiary and a gangue. In embodiments, centrifugal separation includes centrifuge and hydrocyclone separation.

In embodiments, the partitioning of the beneficiation slurry to form the beneficiary and the gangue is achieved by subjecting the beneficiation slurry to one or more centrifugal separation processes wherein the process includes applying a central force of about 1 g to 2000 g to the beneficiation slurry, for example about 1 g to 1500 g, or about 1 g to 1000 g, or about 1 g to 800 g, or about 1 g to 600 g, or about 1 g to 500 g, or about 1 g to 400 g, or about 1 g to 300 g, or about 1 g to 200 g, or about 1 g to 100 g, or about 1 g to 80 g, or about 1 g to 60 g, or about 1 g to 40 g, or about 1 g to 20 g, or about 1 g to 10 g, or about 2 g to 1000 g, or about 4 g to 1000 g, or about 6 g to 1000 g, or about 8 g to 1000 g, or about 10 g to 1000 g, or about 2 g to 100 g, or about 4 g to 100 g, or about 6 g to 100 g, or about 8 g to 100 g, or about 10 g to 100 g to the beneficiation slurry.

The amount of time required for the separation depends on the amount of gravitational force applied to the beneficiation slurry in addition to ore composition, particle size, and the like. In embodiments, the amount of time required to partition the beneficiation slurry to form a beneficiary and a gangue is about 1 second to 7 days; or about 1 second to about 4 days, or about 1 second to 2 days; or about 1 second to 1 day; or about 1 second to 12 hours; or about 1 second to 6 hours; or about 1 second to 3 hours; or about 1 minute to 7 days, or about 5 minutes to 7 days; or about 1 hour to 7 days; or about 3 hours to 7 days; or about 6 hours to 7 days; or about 12 hours to 7 days; or about 1 day to 7 days; or about 1 minute to 1 day, or about 10 minutes to 1 day, or about 30 minutes to 1 day, or about 1 hour to 1 day, or about 1 minute to 12 hours, or about 1 minute to 6 hours, or about 1 minute to 3 hours, or about 10 minutes to 1 day, or about 10 minutes to 12 hours, or about 10 minutes to 6 hours, or about 10 minutes to 3 hours.

Another method of beneficiation employs ambient gravity, that is, 1 g or no applied gravitational force. Such methods include forming a slurry of a comminuted ore with water, and applying the slurry to a settling tank or a countercurrent flow to partition the slurry into an underflow and an overflow. In embodiments, the first underflow includes a first beneficiary. In some embodiments, the first underflow is flocculated to reduce water content and applied as the starting material in an extractive process. In embodiments, the first overflow is discarded or further processed. In embodiments the first overflow is or includes a gangue.

Another method of beneficiation includes comminution of an ore source, classification of the comminuted ore, forming a slurry of the comminuted ore with water, and applying the slurry to a countercurrent flow bed to partition the slurry into an underflow and an overflow. The underflow includes an ore particulate having a reduced amount of silica, an increased amount of extractable mineral product, or both. In embodiments, the overflow includes a reduced size class of particulate termed "superfines", which may be further processed to improve the overall efficiency of countercurrent flow partitioning. In embodiments the underflow is flocculated to reduce water content prior to extractive processing. The underflow, optionally with reduced water content and optionally further combined with one or more additional underflows (e.g. second underflow, third underflow, etc. without limitation), is applied as the starting material in an extractive process.

Accordingly, a method of beneficiation includes comminution of an ore source, followed by classification of the comminuted ore; then combining the classified ore with a water source and a beneficiation agent to form a beneficiation slurry; the beneficiation slurry is partitioned, or separated by a countercurrent flow at 1 g to form a beneficiary and a gangue. Thus, in embodiments, a beneficiation slurry is partitioned into an underflow and an overflow using a countercurrent flow apparatus, wherein the underflow is collected and in embodiments is applied to extractive processing. In embodiments the underflow comprises a beneficiary and the overflow comprises a gangue.

One example of a countercurrent flow process is shown schematically in FIG. 1, wherein arrows represent the flow direction of fluid flows. Tanks 100, 200, 300, 400 are containers that are each adapted to receive an ore slurry and partition or separate the ore slurry into an underflow and an overflow. Tanks 100, 200, 300, 400 are fluidly connected via fluid flow path A in FIG. 1 to collect and transfer overflows 25, 35, 45, 55, collectively $A_o$ and underflows 20, 30, 40, 60, collectively $A_u$. Thus, an ore slurry source 5 is applied to first tank 100 by flow path 10 in fluid communication between source 5 and tank 100. Partitioning inside second tank 100 results in formation of second underflow 30 and second overflow 25 first overflow 55 and first underflow 20. First overflow 55 is collected and/or fluidly transferred for additional processing (not shown). A first underflow 20 is applied to second tank 200; partitioning inside second tank 200 results in formation of second underflow 30 and second overflow 25. Second overflow 25 is reapplied to first tank 100. Second underflow 30 is applied to third tank 300; partitioning inside third tank 300 results in formation of third underflow 40 and third overflow 35. Third overflow 35 is combined with first underflow 20 and reapplied to second tank 200. Third underflow 40 is applied to fourth tank 400; partitioning inside fourth tank 400 results in formation of fourth underflow 50 and fourth overflow 45. Fourth overflow 45 is combined with first underflow 20 and reapplied to second tank 200. Fourth underflow 50 is collected and/or fluidly transferred passed along to a separate process (not shown).

Further in FIG. 1, water source 500 is fluidly connected to fluid flow path A, for example as shown in fluid communication with underflow 40; water source 500 supplies water to the fluid flow path A to maintain a selected fluid viscosity of the fluid in the path, and/or provide suitable ore concentration in the slurry to achieve effective partitioning. In some embodiments, multiple water sources are suitably employed within the fluid flow path for effective separation of overflows and underflows.

In embodiments related to FIG. 1, ore slurry source 5 comprises at least a water source and an ore source. In embodiments, ore slurry source 5 is a bauxite slurry source. In some embodiments a beneficiation agent, either neat or dissolved in water, is applied to the ore slurry source 5, and the ore slurry source is a beneficiation slurry source. The beneficiation slurry source is transferred via flow path 10 to tank 100. In other embodiments, the ore slurry source 5 is added to tank 100 and a beneficiation agent, either neat or dissolved in water, is applied to tank 100 to form a beneficiation slurry therein. In still other embodiments, ore slurry source 5 is combined with a beneficiation agent by addition of the agent in flow path 10 to form a beneficiation slurry within flow path 10. Suitable addition points for applying one or more water sources and/or beneficiation agents are suitably connected in fluid communication with are slurry source 5, flow path 10, tank 100, or a combination of two or more thereof, as selected by an operator. Additional mixing equipment, either active (motorized mixing via paddles, blades, screws, kneaders, and the like) or passive (static mixers and related in-flow mixing designs such as corners, weirs and walls, impinging flows, and the like) are suitably positioned proximal to any one or more selected addition points in order to provide suitable mixing of water, beneficiation agent, or a combination thereof to form a beneficiation slurry for partitioning within tank 100.

In similar fashion to the above, one or more water sources, one or more beneficiation agents, or combinations thereof are suitably placed in fluid communication with ore slurry source 5, flow path 10, tank 100, or at any one or more locations along flow path A. In embodiments one or more beneficiation agents, or combinations thereof are suitably placed in fluid communication with overflow path $A_O$. As shown in FIG. 1, one or more beneficiation agents are suitably applied to one or more fluid flows 10, 20, 25, 30, 35, 40, 45; to one or more tanks 100, 200, 300, 400; to water source 500; or to two or more of these. Mixing equipment, either active (motorized mixing via paddles, blades, screws, kneaders, and the like) or passive (static mixers and related in-flow mixing designs such as baffles, weirs, impinging flows, and the like) are suitably positioned proximal to any one or more selected fluid communication locations in order to provide suitable mixing of water, mixing of beneficiation agent, mixing of water and beneficiation agent, or mixing or of beneficiation agent and water with a fluid in one or more fluid flow paths, tanks, or combination thereof.

In embodiments, a beneficiation agent comprises, consists essentially of, or consists of cationic polymer. In embodiments, a beneficiation agent comprises, consists essentially of, or consists of a polysaccharide. In embodiments, a beneficiation agent comprises, consists essentially of, or consists of a cationic polymer combined with a polysaccharide. In such embodiments, the cationic polymer is combined with the polysaccharide before or after applying to an ore source or ore slurry.

In embodiments, tanks 100, 200, 300, 400 are sedimentation tanks or settling tanks, wherein a gravitational force of 1 g achieves partitioning therein. In other embodiments, tanks 100, 200, 300, 400 are hydrocyclones or centrifuges, wherein a gravitational force of greater than 1 g is applied to achieve partitioning therein. In still other embodiments, a combination of methods are suitably employed by an operator, such as a combination of hydrocyclones and settling tanks; additionally, any number of tanks and flow paths are suitably added within the process of FIG. 1 as shown; for example, 10 tanks or more may be suitably selected by an operator based on the requirements of a particular field location and/or properties of the ore source selected for beneficiation.

It is a feature of the compositions and methods disclosed herein that presently employed industrial processing equipment is modified with ease to add or apply one or more beneficiation agents thereto. It is not necessary to redesign or reconfigure ore beneficiation equipment and flow paths already in place in many industrial mining product processing plants in order to achieve the results reported herein. Additionally, the amount and type of beneficiation agent is easily varied within one or more flow paths to address the fluid flow at the selected addition point. The presently disclosed methods and compositions are easily adapted for use in industrial ore processing equipment already widely employed in the industry. Further, the process represented schematically in FIG. 1 is suitably adapted for continuous or batch beneficiation as selected by an operator.

In embodiments related to FIG. 1, an underflow 50 is a beneficiary. In other embodiments, the beneficiary is an underflow obtained by a modified version of FIG. 1 as discussed above. The beneficiary is enriched in extractable mineral product compared to the corresponding "as-mined" ore, comminuted ore, or classified ore. Compared to the "raw" ore source, the beneficiary includes at least one of increased total mineral product, increased extractable mineral product, a reduced weight percent of total silica, or reduced weight of a silicic specie. Compared to the solids of an ore source subjected to the methods recited herein but without addition of a beneficiation agent, the beneficiary solids include at least one of: increased total mineral product; increased extractable mineral product; reduced weight percent of total silica; a reduced weight of a silicic specie The presently disclosed methods and compositions are easily adapted for use in industrial ore processing equipment already widely employed in the industry. The presently disclosed compositions and methods are thus easily adapted for use in connection with both hydrocyclone and countercurrent flow apparatuses. For example, in an embodiment, tanks 100, 200, 300, 400 of FIG. 1 are suitably replaced with hydrocyclones, wherein further application of a central force may accelerate separation or partitioning. Further, the process represented schematically in FIG. 1 is suitably adapted for batch beneficiation.

Compared to the ore source, the beneficiary includes at least one of an increased total mineral product:total silica ratio, an increased available mineral product:total silica ratio, a reduced weight percent of total silica, a reduced weight percent of a silicic specie, an increased weight percent of total mineral product, or an increased weight percent of available mineral product. For purposes of the present disclosure, "silica" refers to silica and silicates that are desirably separated from a mineral product; such species may include quartz, kaolin, and/or clay, depending on the ore. Compared to an ore source subjected to the methods recited herein but without addition of a beneficiation agent, the beneficiary includes at least one of an increased total mineral product:total silica ratio, an increased available mineral product:total silica ratio, an increased total mineral product:silicic specie ratio, an increased available mineral product:silicic specie ratio, a reduced weight percent of total silica, a reduced weight percent of a silicic specie, an increased weight percent of total mineral product, or an increased weight percent of available mineral product.

In embodiments, a first overflow (from hydrocyclone or countercurrent flow) includes a reduced size class of particulate termed "superfines". The reduced size class of "superfine" particulates is not limited, but includes an average particle size range that is statistically lower than the average particle size of "fines" as determined by an industry accepted measurement. The relative size regimes of particulates is determined by the specific processes and equipment employed in an actual processing plant. However, it will be appreciated by those of skill that the purpose of applying a particulate slurry to a hydrocyclone, centrifuge, or countercurrent flow is commonly to separate the slurry on a particle size basis.

Thus, in some embodiments, a first overflow from a first beneficiation (first gangue) is applied to a second beneficiation process to partition the first overflow (first gangue) to form a second underflow (second beneficiary) and a second overflow (second gangue). In some such embodiments, the second beneficiary is combined with the first beneficiary to form a combined beneficiary. In embodiments, a continuous process includes continuously forming beneficiaries and continuously forming gangues; and one or more of combining one or more beneficiaries, combining one or more gangues, subjecting one or more gangues to one or more additional beneficiation processes, and subjecting one or more beneficiaries to one or more additional beneficiation processes. In some embodiments the one or more beneficiation processes combine one or more types of gravity partitioning or separating methods. The one or more beneficiation processes are the same or different in this respect; in one non-limiting example, a first beneficiation comprises hydrocyclone separation, and a second beneficiation comprises countercurrent flow separation; in another non-limiting example, a first beneficiation comprises countercurrent flow separation, a second beneficiation comprises hydrocyclone separation, and a third beneficiation comprises settling. Depending on the requirements of the desired mineral product and the mineral ore bearing the desired mineral product, any combination of gravity separation processes as disclosed herein are suitably combined in any order and in any number of total gravity separations, to achieve two or more beneficiation processes according to the description herein.

The beneficiation agent is added to the comminuted ore, to the water source that is added to the comminuted ore to form an ore slurry, or to the ore slurry prior to a first gravity separation (hydrocyclone, centrifuge, settler, countercurrent flow). In some embodiments where two or more beneficiation processes are combined, the beneficiation agent is added in a single aliquot prior to the first gravity separation. In other embodiments, the beneficiation agent is added in two or more aliquots, e.g. between gravity separations. In still other embodiments, the beneficiation agent is added in a continuous fashion in one or more locations within a continuous beneficiation process that includes one or more gravity separation processes. Where two or more additions of beneficiation agent are contemplated, the additions are suitably of the same beneficiation agent, or of different beneficiation agents. Thus, two or more beneficiation agents may be added in two or more separate beneficiation processes; there is no particular limitation on the number of different beneficiation agents that may be added within a single batchwise or continuous beneficiation process. Beneficiation agents may differ in terms of at least the following: differing amount of beneficiation agent added by weight or volume to an ore or to a water source or to a slurry; chemical identity of the cationic polymer in a beneficiation agent; molecular weight of the cationic polymer; use of polysaccharide in the beneficiation agent; chemical identity of the polysaccharide; ratio of cationic polymer to polysaccharide, and other differences.

In embodiments, a beneficiary or a combined beneficiary is flocculated to reduce water content, forming a dewatered beneficiary. A beneficiary, including a dewatered beneficiary, is subjected to an extractive process as the starting material therein.

A beneficiation agent comprising, consisting essentially of, or consisting of a cationic polymer provides one or more unexpected benefits in one or more beneficiation methods described herein. In embodiments, a beneficiation agent comprising a cationic polymer and excluding a polysaccharide provides one or more unexpected benefits in one or more beneficiation methods described herein. A beneficiation agent comprising, consisting essentially of, or consisting of a polysaccharide provides one or more unexpected benefits in one or more beneficiation methods described herein. In embodiments, a beneficiation agent comprising a polysaccharide and excluding a cationic polymer provides one or more unexpected benefits in one or more beneficiation methods described herein. In embodiments, a beneficiation agent comprising, consisting essentially of, or consisting of a cationic polymer and a polysaccharide (whether or not these are combined prior to addition thereof to an ore source or an ore slurry) provides one or more unexpected benefits in one or more beneficiation methods described herein. In embodiments, the beneficiary obtained by gravity separation of a beneficiation slurry includes one or more of the following advantages, which are unexpected over the known art of pre-extraction processing. Prior to the disclosures herein, to our knowledge it was not understood that gravitational separation of mineral product ores such as gold, silver, copper, iron, coal, and like ores prior to extractive processing could be affected by a chemical treatment. Specifically, it was not previously known prior to this disclosure that a cationic polymer, or a cationic polymer combined with a polysaccharide, would increase the pre-extraction concentration of a mineral product in an beneficiary when the beneficiary is subjected to gravitation-based separation. Thus, the discovery that these beneficiation agents work as reported is completely unexpected to one of skill in the art of ore processing, in particular pre-extraction processing of ores, and even more particularly pre-extraction processing of ores of "low quality", where low quality means less than a commercially favorable threshold concentration of mineral product in a beneficiary required for extraction.

In some embodiments, a beneficiary according to the presently described processes is characterized as having a weight ratio of total mineral product to total silicates that is greater than the weight ratio of total mineral product to total silicates in a partitioned ore slurry after gravitational separation (beneficiation) in the absence of a beneficiation agent. In some embodiments, a beneficiary according to the presently described processes is characterized as having a weight ratio of total mineral product to a selected silicic specie, such as an aluminosilicate or clay, that is greater than the weight ratio of total mineral product to the silicic specie in a partitioned are slurry after gravitational separation (beneficiation) in the absence of a beneficiation agent. In embodiments, the presently described gravitational beneficiation processes, including one or more beneficiation agents, result in an overall increase of the total mineral product to total silica ratio over conventional gravity-based partitioning methods known to those of skill in pre-extractive ore processing. Such methods include settling, countercurrent flow separation, and centrifugal methods (using applied gravitational force in excess of ambient gravitational force) including hydrocycloning and centrifuging.

In embodiments, the benefits of the presently described processes exceed the benefit of increasing the ratio of the desired product in the collected beneficiary. For example, in embodiments, the mineral product ore slurry is conventionally subjected to one or more froth flotation processes after a beneficiation process, wherein one or more silicic species reduce the efficiency of the flotation by reacting with reagents intended to obtain separation during the froth flotation process. Thus for example, in embodiments the mineral product in a slurry is a phosphate ore, wherein the ore is conventionally subjected to one or more froth flotation processes after beneficiation. In such embodiments, we have found that reduction of silicic species from a phosphate ore slurry during beneficiation includes reduction of aluminosilicates (clays) that reduce the efficiency of subsequent froth flotation carried out on the beneficiary. Stated differently, in embodiments, mineral product ore slurries subjected to the presently described beneficiation processes obtain both an increased amount of mineral product going into a subsequent froth flotation process, and increased efficiency in froth flotation due to reduced concentration of aluminosilicates.

An important measure of beneficiary quality is weight percent of "extractable" or "available" mineral product in the beneficiary. Extractable or available mineral product is the theoretical yield of mineral product available from the planned extractive process, and is different from total mineral product because in embodiments, not all mineral product species are extracted by an extraction process. In some embodiments, a beneficiary obtained according to one or more of the presently described beneficiation processes includes at least 3 wt % and as much as 20 wt % more extractable mineral product than the ore slurry prior to beneficiation, for example about 3 wt % to 15 wt %, or about 3 wt % to 10 wt %, or about 3 wt % to 8 wt %, or about 3 wt % to 6 wt %, or about 4 wt % to 8 wt %, or about 5 wt % to 10 wt %, or about 5 wt % to 8 wt %, more extractable mineral product than the ore slurry prior to beneficiation.

EXPERIMENTAL

Example 1

An ore processing plant employing hydrocyclones to partition ore slurries partition the applied mass at a ratio of about 50% overflow to 50% underflow, while the volume partitioning is about 80% in the overflow to 20% in the underflow. We have found dynamic distribution of these parameters in a hydrocyclone may be mimicked using a static centrifuge method by applying 80 g of force for 60 seconds to a slurry in a centrifuge tube, then removing about 80% of the volume of the contents of the centrifuge tube by suctioning supernatant liquid from the top of the centrifuge tube using a syringe. The supernatant removed is representative of the hydrocyclone "overflow", or gangue, while the remainder is representative of the "underflow", or beneficiary, obtained from a hydrocyclone. The portion of the contents remaining in the tube after supernatant removal is flocculated to reduce water content, and the flocculated material is collected, dried at 120° C. for 8-16 hours, and analyzed for content of mineral product, silica species, or both.

To obtain a control measurement, 8 samples of an exemplary are slurry comprising a water source and ore fines characterized as phosphate ore fines, including about 10% ore solids as received, are centrifuged as described above without further modification. After centrifugation, each underflow is collected, flocculated, and dried. An average of measurements of the 8 centrifuged, collected, flocculated, and dried underflow samples provides a baseline measurement of the effect of beneficiation. The average of these measurements provides baseline of about 47 wt % of total mineral product and about 14.2 wt % total silica, resulting in an mineral product:silica weight ratio of 3.3.

To test beneficiation agents, vortex mixing is applied to 45 mL of the ore slurry for about 30 seconds, then the mixing is paused; the beneficiation agent is added in a selected amount, and mixed thoroughly using the vortex mixer; then 80 g is applied to the resulting mixture in a centrifuge for approximately 60 seconds; then the supernatant is removed and the remaining material (beneficiary) is flocculated and dried. The dry beneficiary is measured for mineral product and silica content. Where an addition includes more than one agent, the agents are premixed and added contemporaneously. The additions are carried out by applying the agents as received, wherein amount added is calculated based on e.g. percent solids as provided.

Results of testing the beneficiation agents relative to the Control (no beneficiation agent) provide one or more of the following observed properties: increase in weight percent total mineral product in the beneficiary; increase in weight percent extractable mineral product in the beneficiary; decrease in weight percent silica species in the beneficiary; increase in overall mineral product:silica ratio in the beneficiary. The beneficiaries from the exemplary ore slurry are found to include about 48 wt % to 95 wt % of total mineral product.

Example 2

An slurry comprising fresh copper sulfide ore fines was prepared by wet grinding a copper ore in a rod mill, then adding water to the ground ore fines to form a slurry having 30 wt % ore solids. To obtain a control measurement, 3 samples were centrifuged as described in Example 1 above, without addition of any beneficiation agents. After centrifugation, each beneficiary and supernatant were collected, flocculated, and dried as described in Example 1. Analysis of this sample provided a baseline measurement of the benefits of beneficiation by centrifugal force alone. The results provided a baseline beneficiary measurement of about 66.1 wt % of total silica and a baseline supernatant measurement of about 49.4 wt % total silica.

Vortex mixing was applied to a different 45 mL sample of the copper ore slurry for about 30 seconds, then the mixing was paused; then 808 grams/ton DADMAC homopolymer (intrinsic viscosity of 0.35 to 0.55 dl/g) was added to the slurry and mixed thoroughly using the vortex mixer, then 80 G was applied to the resulting mixture in a centrifuge for approximately 60 seconds. Then the supernatant was removed, flocculated and dried as described in Example 1 and silica content analyzed. The beneficiary was also collected, flocculated and dried as described in Example 1, and silica content analyzed.

The addition of DADMAC homopolymer produced a beneficiary having about 54.8 wt % of total silica and a supernatant having about 55.0 wt % total silica.

It was determined that addition of the DADMAC homopolymer produces a significant decrease in percent silica in the beneficiary and an increase in percent silica in the supernatant for copper bearing ores.

Example 3

An additional set of experiments is conducted according to the procedure of Example 1, but with an ore slurry characterized as a gold ore slurry. The results are similar to those obtained in Examples 1 and 2 above.

Example 4

An additional set of experiments is conducted according to the procedure of Example 1, but with a polymer that is 50 mole % DADMAC and 50 mole % acrylic acid (that is, the net charge of the polymer is 0). The beneficiary obtained includes about 47 wt % of total mineral product and about 14.2 wt % total silica, or about the same as obtained in the control measurement.

Example 5

A first, 500 mL beaker is filled with the slurry of Example 1. Then 110 g/ton of DADMAC homopolymer ("chemical") is mixed into the slurry for 1 minute with a spatula. The slurry is then allowed to stand for about 5 minutes. Then about 350 ml of liquid is carefully decanted into a second beaker. Then 150 ml of deionized water is added to the first beaker, then an additional 100 g/ton of chemical is added; the beaker contents are mixed with the spatula for one minute, and allowed to settle for 5 minutes. Then 37 g/ton of chemical is added to the second beaker along with sufficient deionized water to fill the beaker to 500 mL; the beaker contents are mixed with the spatula for one minute, and allowed to settle for 5 minutes. Then 350 ml is decanted from the second beaker into a third beaker; the then third beaker is filled with deionized water (to 500 mL). Then 350 ml is decanted from the first beaker into the second beaker; the then first beaker is filled with deionized water (to 500 mL). Then 37 g/ton of chemical is added to each beaker and again all beakers are mixed with spatula for one minute, followed by a 5 minute settling period. Then 350 ml is decanted from the third beaker into a fourth beaker; the then fourth beaker is filled with deionized water (to 500 mL). Then 350 ml is decanted from the second beaker into the third beaker; and 350 ml is decanted from the first beaker into the second beaker; 150 mL of water is added to the first beaker. Then 18 g/ton of chemical is added to each beaker and again all beakers are mixed with spatula for one minute, followed by a 5 minute settling period.

Then the following process is repeated five (5) times, followed by collecting the beneficiary from the first beaker. Take about 425 ml of decant from fourth beaker and place into a clean 1 liter beaker. Take about 425 ml of decant from third beaker and place into fourth beaker, take about 425 ml of decant from the second beaker and place into the third beaker, and take about 425 ml of decant from first beaker and place into the second beaker. Then add 425 ml of $H_2O$ to the first beaker (bringing volume up to 500 ml) and add 18 g/ton of chemical to first beaker only. Mix all beaker contents (except the 1 liter beaker) with a spatula for one minute, and allow to settle for five minutes; then repeat the process.

After the above process is complete, begin to remove almost all of the liquid decant from each beaker starting with the fourth beaker and working towards the first beaker, with each stage in between being mixed after decant for one minute with spatula followed by a settling period of 5 minutes. The first beaker contains a beneficiary.

The process is repeated with the second, third, and fourth beakers to obtain beneficiaries therefrom. The beneficiaries are found to include about 10 wt % to 90 wt % greater total mineral product than the raw ore starting material.

Example 6

Phosphate ore fines were obtained by grinding an ore from a phosphate mine. Water was added to the fines in an amount sufficient to provide a slurry having 30 wt % ore solids. To obtain a control measurement, 3 slurry samples were centrifuged as described in Example 1 without further modification. After centrifugation, each beneficiary and supernatant were collected, flocculated, and dried as described in Example 1. Analysis of this sample provided a baseline measurement of the benefits of beneficiation by centrifugal force alone. The analysis obtained a control beneficiary having 4.91 wt % of total silica and 0.54 wt % aluminum (also listed in Table 1 for "Control").

Vortex mixing was applied to three 45 mL samples of the phosphate ore slurry for about 30 seconds, then the mixing was paused; the DADMAC homopolymer used in Example 2 was added at doses of 533, 711 and 889 grams/ton to the three samples respectively, and the samples were mixed thoroughly using the vortex mixer. Then 80 G was applied to the resulting mixtures in a centrifuge for approximately 60 seconds, then the supernatant (overflow) was removed and the beneficiary (underflow) collected, flocculated and dried as described above and tested for silica and aluminum content (where aluminum measured is indicative of aluminosilicate or clay content).

Results obtained by adding DADMAC homopolymer as beneficiation agent relative to the Control (no beneficiation agent) are shown in Table 1. The results clearly show that DADMAC homopolymer produces a significant decrease in both percent silica and percent aluminum in the beneficiary.

TABLE 1

Reduction in silicic species silica and aluminosilicate (% Al) observed by adding DADMAC homopolymer to a phosphate ore slurry, followed by beneficiation.

| DADMAC homopolymer, g/ton | Underflow Total Wt % Silica | Underflow % Silica Reduction | Underflow Total Wt % Al | % Decrease in Al |
|---|---|---|---|---|
| 0 (Control) | 4.91 | 0.00 | 0.53 | 0 |
| 533 | 3.47 | 29.40 | 0.41 | 22.2 |
| 711 | 3.70 | 24.59 | 0.43 | 19.3 |
| 889 | 4.14 | 15.75 | 0.42 | 21.5 |

Example 7

The procedure of Example 6 was repeated, except using chitosan (3 wt % dissolved in 1% acetic acid; obtained from Tidal Vision of Ferndale, WA). The 3 wt % chitosan solution was added to provide doses of 533 and 889 grams/ton to two of the slurry samples, respectively. Results are shown in Table 2. The results clearly show that chitosan produces a significant decrease in percent silica and percent aluminum (indicative of aluminosilicate content) in the beneficiary ("underflow").

TABLE 2

Reduction in silicic species observed by adding chitosan to a phosphate ore slurry, followed by beneficiation.

| Chitosan, g/ton | Underflow Total Wt % Silica | Underflow % Silica Reduction | Underflow Total Wt % Al | % Decrease in Al |
|---|---|---|---|---|
| 0 (Control) | 4.91 | 0.00 | 0.53 | 0 |
| 533 | 4.11 | 16.28 | 0.47 | 11.94 |
| 889 | 3.93 | 19.92 | 0.40 | 26.01 |

What is claimed is:

1. A method of pre-extractive processing of an ore, the method comprising: combining an ore source comprising a mineral product, a water source, and a first beneficiation agent to form a first beneficiation slurry; and partitioning the first beneficiation slurry by gravitational separation to form a first beneficiary and a first gangue, wherein the first beneficiation agent comprises a cationic polymer, a polysaccharide, or a combination thereof, wherein the combining and the partitioning are carried out prior to extractive processing of the ore source.

2. The method of claim 1 wherein the ore source is a comminuted ore source or a classified ore source.

3. The method of claim 1 herein the mineral product comprises gold, silver, copper, iron, phosphate, or coal.

4. The method of claim 1 further comprising collecting the first beneficiary and extracting a mineral product therefrom.

5. The method of claim 4, further comprising flocculating the first beneficiary, dewatering the first beneficiary, or both after the collecting.

6. The method of claim 1 wherein the first beneficiary comprises about 1 wt % to 99 wt % more total mineral product than a beneficiary obtained in the absence of the beneficiation agent.

7. The method of claim 1 wherein the first beneficiary comprises less silica than a beneficiary obtained in the absence of the beneficiation agent.

8. The method of claim 1 wherein the first beneficiary comprises less aluminum, alumina, aluminosilicate, or two or more thereof than a beneficiary obtained in the absence of the beneficiation agent.

9. The method of claim 1 wherein the method further comprises applying the first gangue to a second partitioning to obtain a second beneficiary and a second gangue.

10. The method of claim 9 wherein the second beneficiary is combined with the first beneficiary or with another beneficiary to form a combined beneficiary.

11. The method of claim 1 wherein the partitioning excludes an applied gravitational force.

12. The method of claim 11 wherein the partitioning comprises applying a countercurrent flow.

13. The method of claim 12 wherein the partitioning is applying the first beneficiation slurry to a first countercurrent flow, wherein the first beneficiary is a first underflow, and the first gangue is a first overflow.

14. The method of claim 13 wherein the method further comprises applying the first gangue to a second countercurrent flow to obtain a second beneficiary and a second gangue.

15. The method of claim 14 wherein the second beneficiary is combined with the first beneficiary or with another beneficiary to form a combined beneficiary.

16. The method of claim 1 wherein the partitioning comprises an applied gravitational force.

17. The method of claim 16 wherein the partitioning comprises centrifuge separation or hydrocyclone separation.

18. The method of claim 1 wherein the cationic polymer is selected from homopolymers or copolymers of diallyldimethylammonium chloride (DADMAC), quaternized amino functional acrylates, quaternized amino functional acrylamides, or a combination thereof.

* * * * *